United States Patent
Ragupathi et al.

(10) Patent No.: US 10,416,981 B2
(45) Date of Patent: Sep. 17, 2019

(54) SYSTEMS AND METHODS FOR ON-DEMAND LOADING OF ADDED FEATURES FOR INFORMATION HANDLING SYSTEM PROVISIONING

(71) Applicant: Dell Products L.P., Round Rock, TX (US)

(72) Inventors: Dinesh Kunnathur Ragupathi, Round Rock, TX (US); Sundar Dasar, Round Rock, TX (US); Yogesh Prabhakar Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 15/153,550

(22) Filed: May 12, 2016

(65) Prior Publication Data

US 2017/0329612 A1 Nov. 16, 2017

(51) Int. Cl.
*G06F 8/65* (2018.01)
*G06F 9/4401* (2018.01)

(52) U.S. Cl.
CPC .............. *G06F 8/65* (2013.01); *G06F 9/4416* (2013.01)

(58) Field of Classification Search
CPC ........................................................ G06F 8/60
See application file for complete search history.

(56) References Cited

U.S. PATENT DOCUMENTS

| | | | |
|---|---|---|---|
| 7,484,084 B1* | 1/2009 | Ranaweera | G06F 8/67 713/1 |
| 2013/0007437 A1* | 1/2013 | Shroni | G06F 8/665 713/2 |
| 2013/0254527 A1* | 9/2013 | Zhang | G06F 8/665 713/100 |
| 2017/0031694 A1* | 2/2017 | Chu | G06F 9/4416 |

* cited by examiner

*Primary Examiner* — Kim Huynh
*Assistant Examiner* — Joshua Neveln
(74) *Attorney, Agent, or Firm* — Jackson Walker L.L.P.

(57) ABSTRACT

In accordance with embodiments of the present disclosure, a method may include receiving a feature package associated with a provisioning action via a management controller communicatively coupled to a host system and configured to provide management of an information handling system comprising the host system and the management controller via management traffic communicated between the management controller and a network external to the information handling system, extracting components of the feature package including a first binary image and a second binary image, and executing the first binary image, wherein the first binary image is configured to store the second binary image in a portion of a memory accessible to the host system, set a variable flag indicating the management controller is in a maintenance mode, and cause the host system to reboot to execute the second binary image.

20 Claims, 2 Drawing Sheets

SYSTEMS AND METHODS FOR ON-DEMAND LOADING OF ADDED FEATURES FOR INFORMATION HANDLING SYSTEM PROVISIONING

TECHNICAL FIELD

The present disclosure relates in general to information handling systems, and more particularly to methods and systems for provisioning information handling systems via a management controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In typical deployments of information handling systems, certain management capabilities such as update, reconfiguration, extraction of inventory information, etc. may be carried out by a component known as a lifecycle controller. However, many users prefer lower-cost solutions with minimal capabilities, so as to reduce systems cost.

SUMMARY

In accordance with the teachings of the present disclosure, the disadvantages and problems associated with existing approaches for management of an information handling system may be reduced or eliminated.

In accordance with embodiments of the present disclosure, an information handling system may include a host system and a management controller communicatively coupled to the host system and configured to provide management of the information handling system via management traffic communicated between the management controller and a network external to the information handling system. The management controller may further configured to receive a feature package associated with a provisioning action, extract components of the feature package including a first binary image and a second binary image, and execute the first binary image, wherein the first binary image is configured to store the second binary image in a portion of a memory accessible to the host system, set a variable flag indicating the management controller is in a maintenance mode, and cause the host system to reboot to execute the second binary image.

In accordance with these and other embodiments of the present disclosure, a method may include receiving a feature package associated with a provisioning action via a management controller communicatively coupled to a host system and configured to provide management of an information handling system comprising the host system and the management controller via management traffic communicated between the management controller and a network external to the information handling system, extracting components of the feature package including a first binary image and a second binary image, and executing the first binary image, wherein the first binary image is configured to store the second binary image in a portion of a memory accessible to the host system, set a variable flag indicating the management controller is in a maintenance mode, and cause the host system to reboot to execute the second binary image.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to receive a feature package associated with a provisioning action via a management controller communicatively coupled to a host system and configured to provide management of an information handling system comprising the host system and the management controller via management traffic communicated between the management controller and a network external to the information handling system, extract components of the feature package including a first binary image and a second binary image, and execute the first binary image, wherein the first binary image is configured to store the second binary image in a portion of a memory accessible to the host system, set a variable flag indicating the management controller is in a maintenance mode, and cause the host system to reboot to execute the second binary image.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
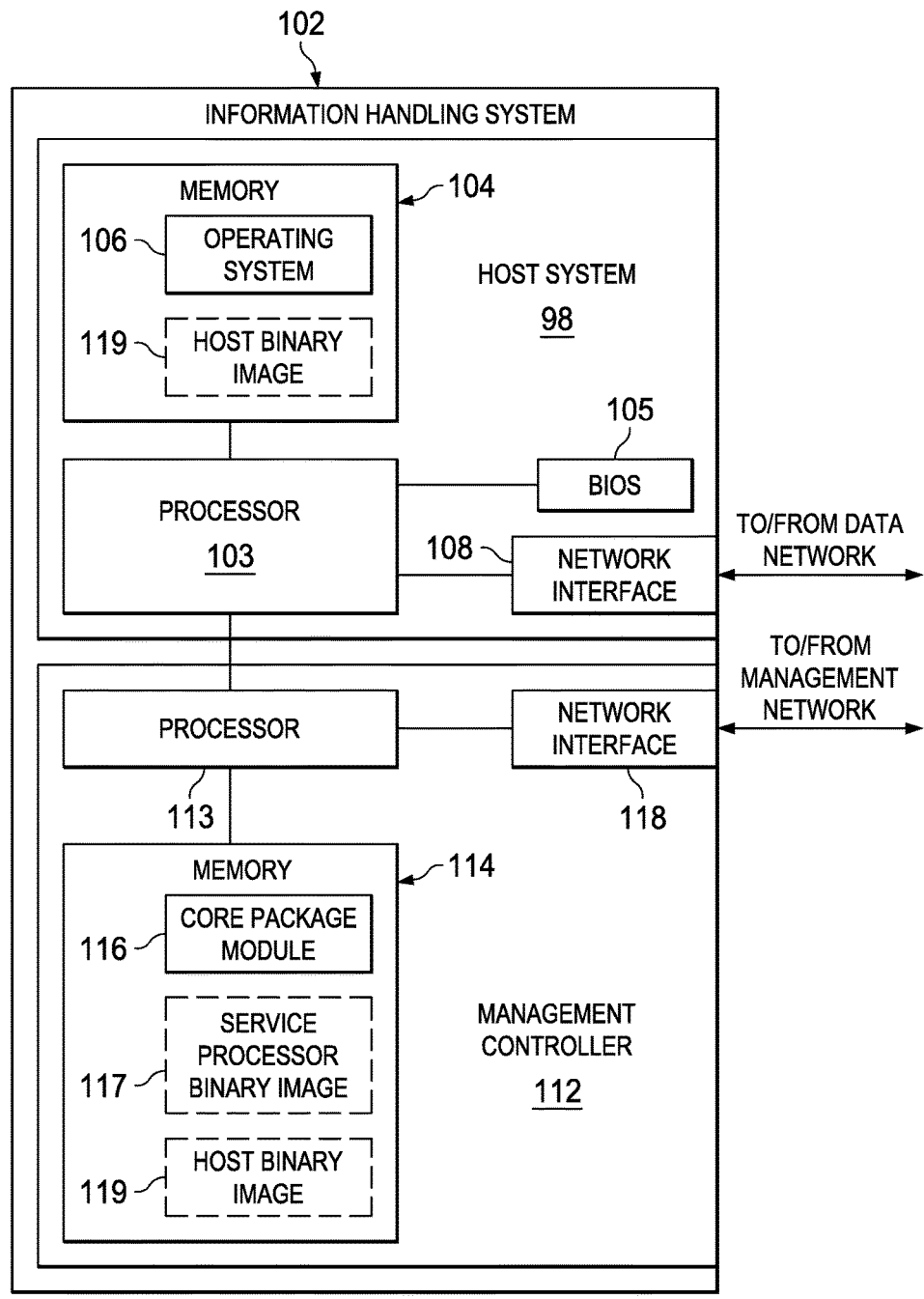
FIG. 1 illustrates a block diagram of an example information handling system, in accordance with embodiments of the present disclosure.
Figure 2:
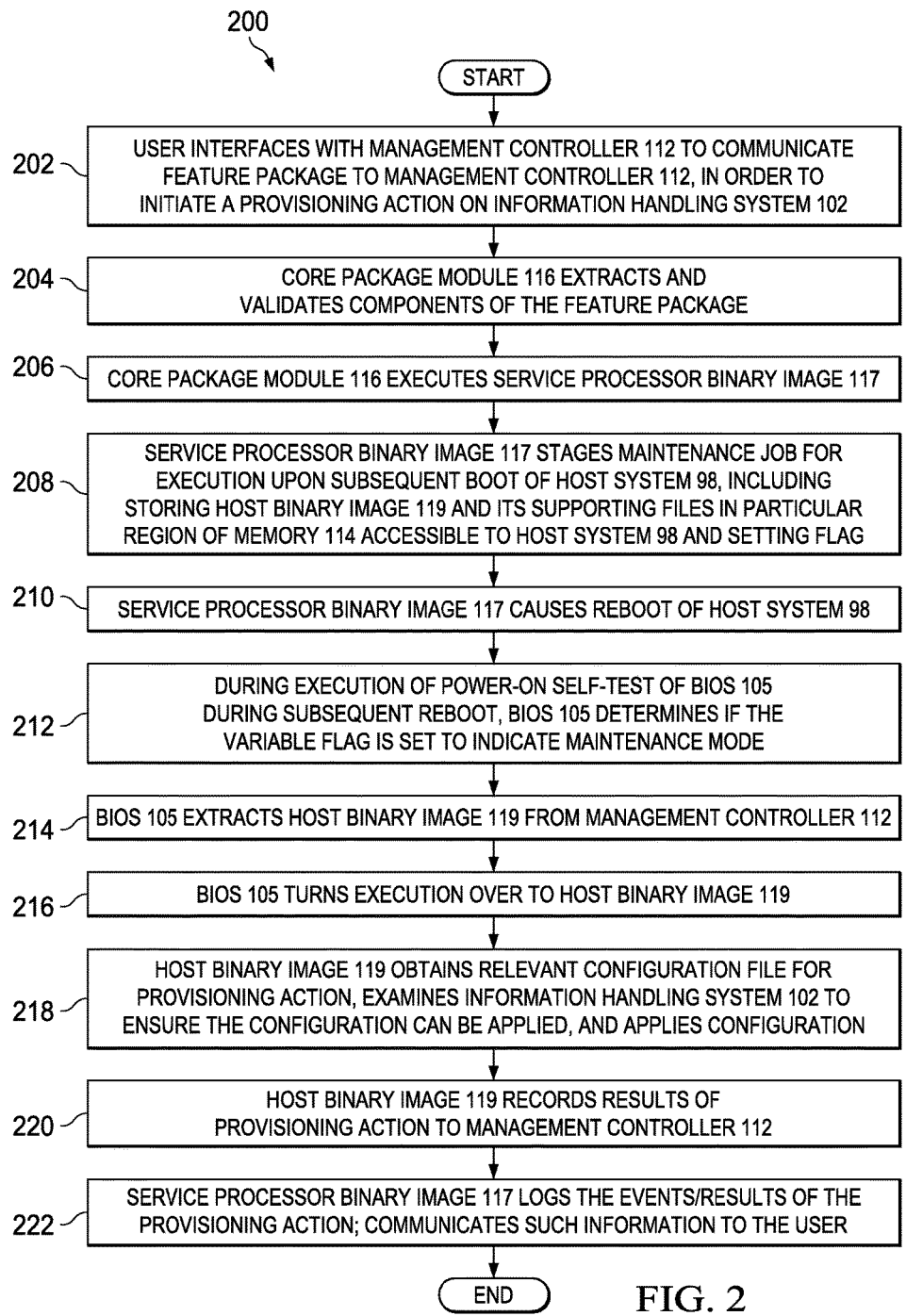
FIG. 2 illustrates a flowchart of an example method for on-demand provisioning, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 is powered off or powered to a standby state. Management controller 112 may include a processor 113, memory 114, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may have stored thereon a core package module 116. Core package module 116 may comprise any program of executable instructions, or aggregation of programs of executable instructions, configured to receive management requests to provision and manage components of information handling system 102, as described in greater detail below. Although core package module 116 is shown in FIG. 1 as stored in memory 114, in some embodiments core package module 116 may be stored in storage media accessible to processor 113, and active portions of core package module 116 may be transferred from such storage media to memory 114 for execution by processor 113.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

In addition to processor 103, memory 104, network interface 108, and management controller 112, information handling system 102 may include one or more other information handling resources In operation, a user (e.g., an administrator) of information handling system 102 may interface with management controller 112 (e.g., either via an out-of-band interface such as Keyboard Control Style via network interface 118 or via an in-band interface such as via operating system 106 with pass-through capability to management controller 112) in order to communicate a feature package to management controller 112, in order to initiate a provisioning action on information handling system 102. The feature package may comprise executable programs such as a service processor binary image 117 and a host binary image 119, as well as lists of dependencies, supported configuration files, software tools required to accomplish a feature set, etc. Upon receipt of the feature package by management controller 112, core package module 116 may extract and validate (e.g., via checksum, key validation, etc.) components of the feature package.

During extraction, components of the feature package, such as service processor binary image 117 and host binary image 119, may be stored/staged on memory 114 of management controller 112. After extraction and validation, core package module 116 may execute service processor binary image 117. During its execution, service processor binary image 117 may stage a maintenance job for execution upon a subsequent boot of host system 98. Such staging may include, without limitation, placing host binary image 119 and its supporting files into a particular region of memory 114 (e.g., a partition or scratch pad) accessible to host system 98. Such staging may also include setting a variable flag in management controller 112 indicating existence of a maintenance mode. Upon completion of such staging, service processor binary image 117 may cause a reboot of host system 98.

Upon such reboot of host system 98, during execution of a power-on self-test of BIOS 105, BIOS 105 may communicate an inquiry to management controller 112 to determine if the variable flag is set to indicate a maintenance mode. If indeed in the maintenance mode, BIOS 105 may extract host binary image 119 from management controller 112 (e.g., via Shared Memory Architecture interface, Keyboard Control Style interface partition, etc.). BIOS 105 may then turn execution over to host binary image 119. During execution, host binary image 119 may obtain a relevant configuration file for the provisioning action, examine information handling system 102 to ensure the configuration can be applied (e.g., a device relating to the configuration is present within information handling system 102), and apply the configuration. Host binary image 119 may also record results of the provisioning action to management controller 112 (e.g., on storage partition of management controller 112 exposed to host system 98, communication of status to user, etc.). In addition or alternatively, service processor binary image 117 may log the events and/or results of the provisioning action and/or may communicate such information to the user.

FIG. 2 illustrates a flowchart of an example method 200 for on-demand provisioning, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a user (e.g., an administrator) of information handling system 102 may interface with management controller 112 (e.g., either via an out-of-band interface such as Keyboard Control Style via network interface 118 or via an in-band interface such as via operating system 106 with pass-through capability to management controller 112) and communicate a feature package to management controller 112, in order to initiate a provisioning action on information handling system 102. As noted above, the feature package may comprise executable programs such as a service processor binary image 117 and a host binary image 119, as well of lists of dependencies, supported configuration files, software tools required to accomplish a feature set, etc.

At step 204, upon receipt of the feature package by management controller 112, core package module 116 may extract and validate (e.g., via checksum, key validation, etc.) components of the feature package. During such extraction, components of the feature package, such as service processor binary image 117 and host binary image 119, may be stored/staged on memory 114 of management controller 112.

At step 206, after extraction and validation, core package module 116 may execute service processor binary image 117. During its execution, at step 208, service processor binary image 117 may stage a maintenance job for execution upon a subsequent boot of host system 98. Such staging may include, without limitation, placing host binary image 119 and its supporting files into a particular region of memory 114 (e.g., a partition or scratch pad) accessible to host system 98. Such staging may also include setting a variable flag in management controller 112 indicating existence of a maintenance mode. At step 210, upon completion of such staging, service processor binary image 117 may cause a reboot of host system 98.

At step 212, upon such reboot of host system 98, during execution of a power-on self-test of BIOS 105, BIOS 105 may communicate an inquiry to management controller 112 to determine if the variable flag is set to indicate a maintenance mode. If indeed in the maintenance mode, at step 214, BIOS 105 may extract host binary image 119 from management controller 112 (e.g., via Shared Memory Architecture interface, Keyboard Control Style interface partition, etc.). At step 216, BIOS 105 may then turn execution over to host binary image 119. At step 218, during execution, host binary image 119 may obtain a relevant configuration file for the provisioning action, examine information handling system 102 to ensure the configuration can be applied (e.g., a device relating to the configuration is present within information handling system 102), and apply the configuration. At step 220, host binary image 119 may also record results of the provisioning action to management controller 112 (e.g., on storage partition of management controller 112 exposed to host system 98, communication of status to user, etc.). At step 222, in addition or alternatively, service processor binary image 117 may log the events and/or results of the provisioning action and/or may communicate such information to the user.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a host system; and
   a management controller communicatively coupled to the host system and configured to provide management of the information handling system via management traffic communicated between the management controller and a network external to the information handling system, the management controller further configured to:
      receive a feature package associated with a provisioning action, wherein the received feature package includes therein a first binary image that is executable by the management controller and a second binary image that is executable by the host system;
      extract components of the feature package including the first binary image and the second binary image; and
      execute the first binary image, wherein the first binary image is configured to:
         store the second binary image in a portion of a memory accessible to the host system;
         set a variable flag indicating the existence of in a maintenance mode; and
         after setting the variable flag, cause the host system to reboot, wherein upon rebooting, the host system is configured to execute the second binary image in response to a detection of the variable flag being set and indicating the existence of the maintenance mode.

2. The information handling system of claim 1, wherein the host system is configured to, during a power-on self-test of a basic input/output system during the reboot caused by the first binary image:
   extract the second binary image from the portion of the memory accessible to the host system; and
   execute the second binary image, wherein the second binary image is configured to:
      obtain a configuration file for the provisioning action; and
      apply the configuration in order to carry out the provisioning action.

3. The information handling system of claim 2, wherein the second binary image is further configured to record results of the provisioning action and communicate the results to the management controller.

4. The information handling system of claim 2, wherein the first binary image is further configured to log results of the provisioning action and communicate the results to a user of the information handling system.

5. The information handling system of claim 1, wherein the network is an out-of-band management network.

6. The information handling system of claim 1, wherein receiving the feature package comprises receiving the feature package via an out-of-band management network communicatively coupled to the management controller.

7. The information handling system of claim 1, wherein the second binary image is configured to execute during execution of a basic input/output system of the information handling system.

8. A method comprising,
   receiving a feature package associated with a provisioning action via a management controller communicatively coupled to a host system and configured to provide management of an information handling system comprising the host system and the management controller via management traffic communicated between the management controller and a network external to the information handling system, wherein the received feature package includes therein a first binary image that is executable by the management controller and a second binary image that is executable by the host system;
   extracting components of the feature package including the first binary image and the second binary image; and
   executing the first binary image, wherein the first binary image is configured to:
      store the second binary image in a portion of a memory accessible to the host system;
      set a variable flag indicating the existence of a maintenance mode; and
      after setting the variable flag, cause the host system to reboot, wherein upon rebooting, the host system executes the second binary image in response to a detection of the variable flag being set and indicating the existence of the maintenance mode.

9. The method of claim 8, further comprising, during a power-on self-test of a basic input/output system during the reboot caused by the first binary image:
   extracting, by the host system, the second binary image from the portion of the memory accessible to the host system; and
   executing, by the host system, the second binary image, wherein the second binary image is configured to:
      obtain a configuration file for the provisioning action; and
      apply the configuration in order to carry out the provisioning action.

10. The method of claim 9, wherein the second binary image is further configured to record results of the provisioning action and communicate the results to the management controller.

11. The method of claim 9, wherein the first binary image is further configured to log results of the provisioning action and communicate the results to a user of the information handling system.

12. The method of claim 8, wherein the network is an out-of-band management network.

13. The method of claim 8, wherein receiving the feature package comprises receiving the feature package via an out-of-band management network communicatively coupled to the management controller.

14. An article of manufacture comprising:
   a non-transitory computer-readable medium; and
   computer-executable instructions carried on the computer-readable medium, the instructions readable by a processor, the instructions, when read and executed, for causing the processor to:
      receive a feature package associated with a provisioning action via a management controller communicatively coupled to a host system and configured to provide management of an information handling system comprising the host system and the management controller via management traffic communicated between the management controller and a network external to the information handling system, wherein the received feature package includes therein a first binary image that is executable by the management controller and a second binary image that is executable by the host system;
      extract components of the feature package including the first binary image and the second binary image; and
      execute the first binary image, wherein the first binary image is configured to:
         store the second binary image in a portion of a memory accessible to the host system;
         set a variable flag indicating the existence of a maintenance mode; and
         after setting the variable flag, cause the host system to reboot, wherein upon rebooting, the host system is configured to execute the second binary image in response to a detection of the variable flag being set and indicating the existence of the maintenance mode.

15. The article of claim 14, further comprising, during a power-on self-test of a basic input/output system during the reboot caused by the first binary image:
   extracting, by the host system, the second binary image from the portion of the memory accessible to the host system; and
   executing, by the host system, the second binary image, wherein the second binary image is configured to:
      obtain a configuration file for the provisioning action; and
      apply the configuration in order to carry out the provisioning action.

16. The article of claim 15, wherein the second binary image is further configured to record results of the provisioning action and communicate the results to the management controller.

17. The article of claim 15, wherein the first binary image is further configured to log results of the provisioning action and communicate the results to a user of the information handling system.

18. The article of claim 14, wherein the network is an out-of-band management network.

19. The article of claim 14, wherein receiving the feature package comprises receiving the feature package via an out-of-band management network communicatively coupled to the management controller.

20. The article of claim 14, wherein the second binary image is configured to execute during execution of a basic input/output system of the information handling system.

\* \* \* \* \*